March 8, 1960 P. BECKMAN 2,927,878
STRAIN GAGE DEVICE AND METHOD OF APPLYING SAME
Filed Sept. 12, 1956
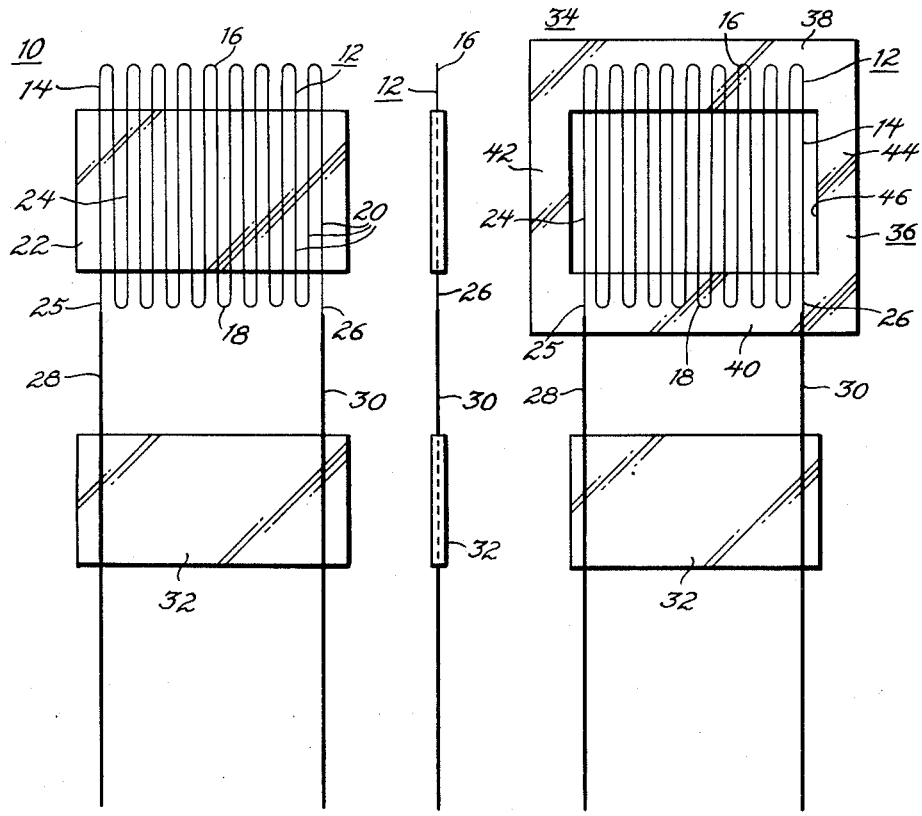
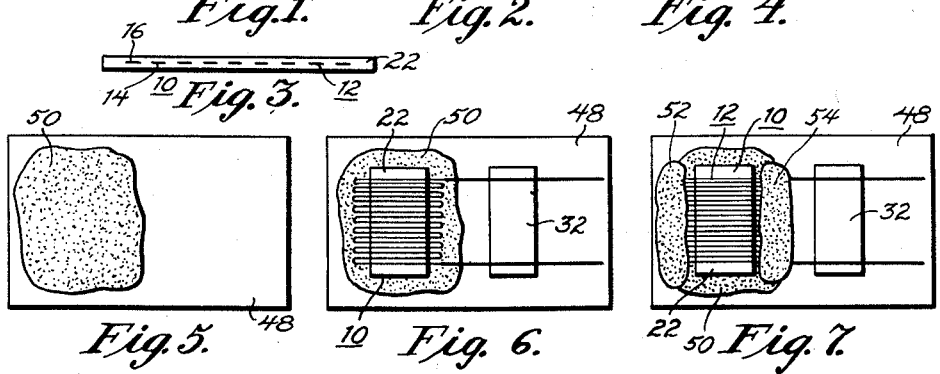
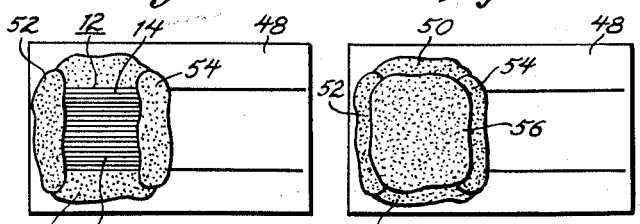
INVENTOR.
PAUL BECKMAN
BY Jacob Trachtman
ATTORNEY

United States Patent Office 2,927,878
Patented Mar. 8, 1960

2,927,878

STRAIN GAGE DEVICE AND METHOD OF APPLYING SAME

Paul Beckman, Glenolden, Pa., assignor to High Temperature Instruments Engineering Corp., Philadelphia, Pa., a corporation of New Jersey Application September 12, 1956, Serial No. 609,430

6 Claims. (Cl. 154—90)

The invention relates to a measuring instrument and more particularly to a device having an electrical resistance element adapted for bonding to a body whose strain is to be measured and the method of affixing the device to the body.

With the increasing need for strain gage devices of greatly reduced size to measure strains produced in small localized areas and with the requirements for high temperature applications, the prior art devices have proved inadequate. The small size of the gage has required many finely spaced filament convolutions. Such prefabricated prior art devices have been found to be defective due to their damage before application, or damage occurring during the application of the device to the body to be tested.

It is therefore a primary object of the invention to provide a new and improved strain gage device of small size which minimizes its damage either before or after its application to a test body.

Another object of the invention is to provide a new and improved strain gage device and method which can be readily and efficiently applied with a high degree of precision to a particular location on a body.

Another object of the invention is to provide a new and improved strain gage device which may have extremely small dimensions while maintaining its operability and practicality.

Another object of the invention is to provide a new and improved strain gage device which is particularly adapted for high temperature applications.

Another object of the invention is to provide a new and improved strain gage device which is readily conformable to the surface of the body to which it is to be applied.

Another object of the invention is to provide a new and improved strain gage device which is inexpensively manufactured and low in cost.

Another object of the invention is to provide a new and improved strain gage device which may be placed in close contact with the surface of the body to be measured.

Another object of the invention is to provide a new and improved strain gage device which after being applied is entirely embedded in cement which bonds it to the test body while substantially maintaining its original preformed configuration for high efficiency operation.

Another object of the invention is to provide a new and improved method for applying the strain gage device which is easily and efficiently accomplished without distorting or damaging the device.

Another object of the invention is to provide a new and improved method of bonding a strain gage device with a body which allows the positioning of the strain gage close to and in conformity with the surface of the body and is entirely embedded in cement applied during the bonding operation.

The above objects of the invention as well as many other objects are achieved by providing a strain gage device comprising an electrical resistance element having first and second portions along its length, and a removable supporting member engaging the second portion of the element. The first portion of the element extends from the member and is adapted for bonding with a body while the element is retained by the supporting member. The second portion of the element is adapted for bonding with the member after the first portion is bonded and the supporting member is removed.

The supporting member may be a film of translucent plastic material which may be readily removed by a solvent.

The method of the invention comprises cementing the first extending portion of the element with the body, permitting the cement to harden for retaining the device, removing the supporting member from the device, and cementing the second portion of the element with the body.

With the foregoing discussion in mind, the invention will become more apparent as the following detailed description of the invention is read in conjunction with the drawings, in which:

Figure 1 is a side elevational view of a strain gage device embodying the invention, Figure 2 is an end elevational view of Figure 1, Figure 3 is a top plan view of Figure 1, Figure 4 is a side elevational view of a strain gage device of modified form, and Figures 5, 6, 7, 8 and 9 illustrate the method of applying or affixing a strain gage device with the surface of a body.

Like numerals designate like parts through the several views.

The Figures 1, 2 and 3 illustrate a strain gage device 10 embodying the invention. The strain gage device 10 comprises an electrical resistance element 12 which has a substantially rectangular configuration and is formed by a continuous filament 14 passing back and forth between the top and bottom ends 16, 18 of the element 12 to produce a plurality of parallel runs 20 between the end portions 16, 18 of the element 12.

The filament 14 of the element 12 may be made of a metallic substance having an electrical resistance which is sensitive to the strain produced in the filament 14. Thus, the electrical resistance element 12 will vary its resistance to indicate the strain produced in the parallel runs 20 in the direction between the end portions 16, 18 of the element 12.

A supporting member 22 engages the intermediate portion 24 of the electrical resistance element 12 for maintaining its filament 14 in the desired configuration.

In order to produce a strain gage device 10 with a resistance element 12 of extremely small dimensions for measuring localized strains, it is necessary to utilize a very thin filament which has its runs 20 closely spaced. The supporting member 22 serves to position the filament and prevent its damage and short circuiting before or during its application to the test surface of a body.

After the filament 14 has been formed in the desired configuration, as by winding over pins in an appropriate forming block, the filament 14 may be maintained in this configuration by engagement with a retaining member 22. In its preferred form, the supporting member 22 may take the form of a thin translucent film of plastic material. Such a supporting member 22 is readily formed by applying over the intermediate portion 24 of a material such as clear airplane dope in its fluid state and permitting it to harden.

The electrical resistance element and supporting member 22 may now be removed from the forming block without disturbing its configuration. The ends 16, 18 of the electrical resistance element 12 extend free and exposed from the supporting member 22.

The advantages of utilizing a thin transparent film member 22 of clear material resides in the ability to accurately locate the device 10 during its application to a surface of the body by being able to see through the member 22. The thinness of the film member 22 provides flexibility which allows the element 12 to be placed very close to the surface of the body. This increases the accuracy of the device 10 while also allowing the easy removal of the member 22 during the application of the device. The application of the device 10 will be described in connection with the method.

Thus, if the film member 22 is made of cellulose acetate or airplane dope, it may be readily removed by dissolving with acetone or a keytone ester. If the supporting member 22 is made of a substance such as methocel, then it can be easily removed by allowing it to evaporate upon the application of heat. The supporting member 22 may be made of a substance which may be removed by the application of heat, may be pealed off or otherwise detached.

The ends 25, 26 of the filament 14 of the electrical resistance element 12 are appropriately connected with respective lead conductors 28, 30. The lead conductors 28, 30 normally are heavier than the filament 14 of the element 12, and may be engaged and retained by a supporting member 32 similar to the supporting member 22.

The many advantages of the electrical resistance element 10 will be apparent in connection with the description of the method for applying the device to the surface of a body.

The Figure 4 illustrates a strain gage device 34 which is a modification of the device 10. The strain gage device 34 differs from the device 10 in that its supporting member 36 is provided with top and bottom portions 38, 40 which respectively engage the top and bottom portions 16, 18 of the electrical resistance element 12. The intermediate portion 24 of the element 12 extends free and exposed from the supporting member 36 within its opening 46. In this form the supporting member 36 also serves to maintain the configuration of the filament before and during its application to a body.

Refer now to the Figures 5, 6, 7, 8 and 9 for a description of the method of applying the strain gage device of the invention.

The Figure 5 shows a body 48 to which a strain gage device of the invention is to be bonded. If the body 48 is made of an electrically conductive material, a coating of insulating cement 50 should be applied to the surface of the body 48 at the location where the gage device is to be bonded.

The next step is to place the strain gage device against the body 48 over the coating of insulating cement 50 oriented in the position in which it is to be secured with the body. For purposes of illustration, the Figure 6 shows the strain gage device 10 positioned in this manner. Since the supporting member 22 may be a clear film of plastic material, this visibility assists in properly and accurately positioning the device 10. The thin plastic supporting member 22 of the device also provides sufficient flexibility to allow it to be positioned close to and in conformity with the surface to which it is being applied.

The next step, which is illustrated by Figure 7, is the application of the layers of insulating cement 52, 54 over the top and bottom exposed and extending end portions 16, 18 of the electrical resistance element 12 of the gage 10. When the layers of cement 52, 54 harden they position the strain gage 10 on the body 48 in the desired location and also maintain the filament 14 of the resistance element 12 in the proper configuration, preventing short circuiting and damage to its delicate structure.

The supporting member 22 of the device 10 may now be removed as shown in Figure 8 without disturbing the configuration of the filament 14 of the electrical resistance element 12. If the supporting member 22 is a film of cellulose acetate, it may easily be removed by dissolving it with a solvent such as acetone or a keytone ester. Similarly, if the supporting member 22 is made of a material such as methocel, it may be evaporated by the application of a sufficient amount of heat. It will also be apparent that other types of supporting members 22 may be pealed off or otherwise removed from the structure without causing its damage. This is because a filament 14 of the resistance element 12 is securely positioned and fastened to the body 48 by the coatings of cement 52 and 54.

It is also noted that the supporting member 32 engaging the leads 28, 30 may be removed in the same manner as the supporting member 22 of the electrical resistance element 12.

The bonding operation may now be completed as illustrated in Figure 9 by the application of a coating of insulating cement 56 over the intermediate portion 24 of the electrical resistance element 12.

If the strain gage device 10 is to be used in high temperature applications, then a ceramic insulating cement can be used for this purpose. The ceramic cement can be applied in the manner just described and finally baked as is generally the custom.

At the completion of the operation of bonding the strain gage device with the body 48 as shown in Figure 9, the filament 14 of the electrical resistance element 12 is completely embedded in a cement material very closely positioned to the surface of the body 48 by being separated only by the base layer 50 which may be made very thin, and accurately positioned in its orientation and location. It is noted that no carrier or other material is now associated with the filament 14 which itself only has been transferred and is bonded with the body 48. This greatly increases the accuracy and the measurements which are obtained and is highly suitable for very high temperature applications. It is also noted that the method of affixing the device eliminates the possibility of damaging the filament 14 or disturbing the direction of the parallel run of the filament 14 which determines the direction that the strain in the body 48 is measured.

It is further noted that the illustrated strain gage devices of this invention and the application of same have many advantages over the construction utilizing a permanent supporting member of insulating cement or other such material in which the filament of the resistance element 12 is secured or embedded.

Such a permanent supporting member is generally hard, brittle and non-flexible, especially when a cement for high temperature application is utilized. This prevents the element 12 from being closely conformed with the contour of the surface to which it is being applied. If such a device is forced into the desired contour, the filament may be prestressed and damaged. Or if it does not conform with the desired surface, then the accuracy of the readings will be affected.

Such a cement carrier is also generally opaque, and does not allow the precise positioning of the element 12 which is provided by a translucent plastic supporting member. Since the permanent supporting member is made of a material which is predetermined by the manufacturer, the person applying the device cannot embed the device during its application in a bonding material of his selection. This results in the bonding of the permanent supporting member of the gage with a second cement which may have a different composition or other characteristics because of its fresh application. Thus, such a gage is applied by being embedded in materials which may have different characteristics. This results in indications of strain which are due to the differential characteristics of the cement. Such readings do not show true strain and result in inaccurate and incorrect indications of the strain which is to be measured by the device.

Since the illustrated devices of the invention by their construction and by the method of their application may be accurately positioned close to the surface of the test body and embedded in layers of cement, all of which are homogeneous and freshly applied during the application of the device, the above difficulties are not present.

It is noted that the modified strain gage device 34 may be applied to a body in a manner similar to that described for the device 10. In this case, however, the intermediate portion 24 of the electrical resistance device 12 is first secured with the body 48, before the carrier or supporting member 36 is removed. Upon the removal of the carrier 36, the end portions 16, 18 which are now exposed may have a layer of cement applied to fully embed and secure the electrical resistance element 12 with the body 48.

It will be obvious to those skilled in the art that the invention may find wide application with appropriate modification to meet the design circumstances, but without substantial departure from the essence of the invention.

What is claimed is:

1. The method of bonding to a test body a strain gage device of the type having an electrical resistance element comprising a filament with a first extending exposed portion and a second portion engaged by a translucent supporting member which comprises accurately positioning on a test body the gage by sighting through the translucent film, cementing the exposed first portion of said filament with said body, permitting the cement to harden, and removing the translucent supporting member from said device to entirely expose and permit the cementing of the second portion of said filament with said body.

2. The method of bonding to a test body a strain gage device of the type having an electrical resistance element comprising a filament with a first extending exposed portion and a second portion engaged by a translucent supporting member which comprises accurately positioning on a test body the gage by sighting through the translucent film, cementing the exposed first portion of said filament with said body, permitting the cement to harden for retaining the device, removing the translucent supporting member from said device to expose the second portion of said filament and cementing the exposed second portion of said filament with said body.

3. The method of bonding to a test body a strain gage device of the type having an electrical resistance element comprising a filament with a first extending exposed portion and a second portion engaged by a translucent flexible supporting member which comprises accurately positioning on a test body the gage by sighting through the translucent film, cementing the exposed first portion of said filament with said body, permitting the cement to harden for retaining the device, removing the translucent supporting member from said device to expose the second portion of said filament by dissolving the supporting member by applying a solvent, and cementing the exposed second portion of said filament with said body.

4. The method of bonding to a test body a strain gage device of the type having an electrical resistance element comprising a filament with a first exposed portion and a second portion engaged by a translucent flexible supporting member which comprises accurately positioning on a test body the gage by sighting through the translucent film, cementing the exposed first portion of said filament with said body, permitting the cement to harden for retaining the device, removing the supporting member from said device to expose the second portion of said filament, completely removing the translucent supporting member from said device to entirely expose the second portion of said filament by the application of heat to the supporting member, and cementing the exposed second portion of said filament with said body.

5. The method of bonding to a test body a strain gage device of the type having an electrical resistance element comprising a filament with a first extending exposed portion and a second portion engaged by a translucent flexible supporting member which comprises accurately positioning on a test body the gage by sighting through the translucent film, cementing the exposed first portion of said filament with said body, permitting the cement to harden for retaining the device, removing the translucent supporting member from said device to expose the second portion of said filament by evaporating the supporting member, and cementing the exposed second portion of said filament with said body.

6. The method of bonding to a test body a strain gage device of the type having an electrical resistance element comprising a filament with a first extending exposed portion and a second portion engaged by a translucent flexible removable supporting member which comprises accurately positioning on a test body the gage by sighting through the translucent film, coating the body with a cement, placing the device against said body and in contact with said cement, applying a coating of cement to the exposed first portion of said filament for bonding it with said body, permitting the cement to harden for retaining and positioning the device, removing the translucent supporting member from said device to expose the second portion of said filament, and applying a coating of cement to the exposed second portion of said filament for bonding it with said body.

References Cited in the file of this patent

UNITED STATES PATENTS

| | | |
|---|---|---|
| 2,344,647 | Simmons | Mar. 21, 1944 |
| 2,350,073 | Simmons | May 30, 1944 |
| 2,451,360 | Skehan | Oct. 12, 1948 |
| 2,548,592 | De Michele | Apr. 10, 1951 |
| 2,626,338 | Mitchell | Jan. 20, 1953 |
| 2,704,879 | Diggle | Mar. 29, 1955 |

FOREIGN PATENTS

| | | |
|---|---|---|
| 631,887 | Great Britain | Nov. 11, 1949 |